United States Patent
Harris et al.

(10) Patent No.: US 9,574,657 B1
(45) Date of Patent: Feb. 21, 2017

(54) TRANSMISSION WITH ACCELERATION-COMPENSATED VALVE CONTROL

(71) Applicant: GM GLOBAL TECHNOLOGY OPERATIONS LLC, Detroit, MI (US)

(72) Inventors: Shawn M. Harris, Ypsilanti, MI (US); Timothy R. Stockdale, Brighton, MI (US); Joel H. Gunderson, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/955,648

(22) Filed: Dec. 1, 2015

(51) Int. Cl.
*F16H 61/02* (2006.01)
*F16H 61/00* (2006.01)
*F16H 59/48* (2006.01)
*F16H 59/68* (2006.01)

(52) U.S. Cl.
CPC ......... *F16H 61/0265* (2013.01); *F16H 59/48* (2013.01); *F16H 59/68* (2013.01); *F16H 61/0021* (2013.01); *F16H 61/0276* (2013.01); *B60W 2520/105* (2013.01); *B60W 2520/125* (2013.01); *F16H 61/0283* (2013.01); *F16H 2059/683* (2013.01)

(58) Field of Classification Search
None
See application file for complete search history.

(56) References Cited

U.S. PATENT DOCUMENTS

| | | | | |
|---|---|---|---|---|
| 6,328,673 B1* | 12/2001 | Monowa | .............. | F16H 61/061 477/120 |
| 2004/0138024 A1* | 7/2004 | Kano | .................... | B60W 10/11 477/74 |
| 2004/0242374 A1* | 12/2004 | Wheals | .................. | F04B 17/03 477/120 |
| 2008/0318727 A1* | 12/2008 | Matsubara | ............ | B60K 6/445 477/3 |
| 2009/0187324 A1* | 7/2009 | Lu | .......................... | B60K 31/00 701/94 |
| 2009/0227417 A1* | 9/2009 | Imamura | ................ | B60K 6/445 477/5 |
| 2012/0232764 A1* | 9/2012 | Inagawa | ................. | F02D 29/02 701/54 |
| 2014/0142822 A1* | 5/2014 | Li | .......................... | F16H 61/00 701/55 |

* cited by examiner

*Primary Examiner* — Justin Holmes
(74) *Attorney, Agent, or Firm* — Quinn Law Group, PLLC

(57) ABSTRACT

A vehicle includes an engine, a transmission, and a controller. The transmission includes a pressure control solenoid (PCS) valve device having a PCS and a regulating valve, a friction clutch, and a clutch piston in fluid communication with the regulating valve. The piston is operable to apply a clutch pressure to the friction clutch during a shift of the transmission. The controller is programmed to receive an acceleration value describing a lateral and/or longitudinal acceleration force of the vehicle, calculate the clutch pressure using the received acceleration value, and control an operation of the regulating valve via the PCS using the calculated clutch pressure. The acceleration value may be determined via one or more accelerometers or calculated. A method is also disclosed for compensating for acceleration in control of the regulating valve in a vehicle having a transmission that includes a friction clutch, PCS, and regulating valve.

20 Claims, 2 Drawing Sheets

TRANSMISSION WITH ACCELERATION-COMPENSATED VALVE CONTROL

TECHNICAL FIELD

The present disclosure relates to a transmission with acceleration-compensated valve control.

BACKGROUND

A friction plate clutch of an automatic transmission is ordinarily applied via a clutch piston, which in turn is actuated via hydraulic fluid pressure. Hydraulic fluid pressure supplied to a given friction plate clutch is closely regulated via the use of a regulating valve, which in turn may be controlled by a pressure control solenoid (PCS). Clutch pressure is typically calculated via a transmission control module rather than directly measured. For instance, the transmission control module may multiply a commanded PCS pressure by a calibrated gain, with the calibrated gain being a function of the geometry of the regulating valve upon which the PCS pressure acts. However, such methods may be less than optimal when performing shifts during certain driving maneuvers.

SUMMARY

A vehicle is disclosed herein having an engine, a transmission, and a controller. The transmission includes a friction clutch and a regulating valve controlled, e.g., by a pressure control solenoid (PCS) valve device. As used herein, the term PCS valve device may include a PCS and a separate regulating valve, or it may include a direct acting PCS with an integral regulating valve. Hydraulic clutch pressure to the friction clutch is controlled through the regulating valve, such as via operation of the PCS. The pressure characteristics of the PCS are calibrated, e.g., recorded in a pressure vs. current characteristic table, such that a commanded electrical current to the windings of the PCS corresponds to a commanded PCS pressure from the controller. The controller executes steps of a method as set forth herein to calculate the clutch pressure in a manner that compensates for inertial effects on the regulating valve during threshold longitudinal and/or lateral acceleration of the vehicle.

It is noted herein that due to the mass of the regulating valve, pressure commands to the clutch during a shift of the transmission may be affected at times by vehicle acceleration. Such performance effects, which may manifest themselves as transient turbine flare or tie-up depending on the direction and magnitude of acceleration and the orientation of the regulating valve, may be more noticeable to a driver at higher acceleration levels typically experienced at times by certain high-performance vehicles. Therefore, the present approach uses accelerometer readings and/or calculated acceleration levels to determine the acceleration forces acting on the regulating valve, and then compensates for such acceleration effects using an offset pressure as set forth herein. As a result, transient conditions that may otherwise adversely affect shift quality due to acceleration can be largely avoided.

In a particular embodiment, a vehicle is disclosed that includes an engine, a transmission connected to the engine, and a controller. The transmission includes a PCS valve device, which includes a separate or solenoid-integrated regulating valve controlled via a PCS. The transmission also includes a friction clutch and a clutch piston in fluid communication with the regulating valve. The clutch piston is operable to apply a clutch pressure to the friction clutch during a shift of the transmission. The controller, which is in communication with the PCS, is programmed to determine, i.e., receive or calculate, an acceleration value describing a lateral and/or longitudinal acceleration of the vehicle, and then calculate the clutch pressure using the received acceleration value(s). The controller thereafter controls the operation of the PCS, and thus the regulating valve, during the shift of the transmission using the calculated clutch pressure, thereby minimizing instances of turbine flare or tie-up during the shift.

A transmission system includes the PCS valve device having a PCS and a regulating valve, and further includes a friction clutch, clutch piston, and controller as noted above.

A method for compensating for the effects of acceleration in control of a regulating valve of a PCS valve device in a vehicle having a transmission includes determining, via a controller, an acceleration value describing at least one of a lateral and longitudinal acceleration of the vehicle. The method also includes calculating the clutch pressure via the controller using the received acceleration value, and controlling an operation of a PCS during the shift of the transmission using the calculated clutch pressure.

The above features and advantages, and other features and advantages, of the present disclosure are readily apparent from the following detailed description of some of the best modes and other embodiments for carrying out the disclosure, as defined in the appended claims, when taken in connection with the accompanying drawings.

DETAILED DESCRIPTION

Figure 1:
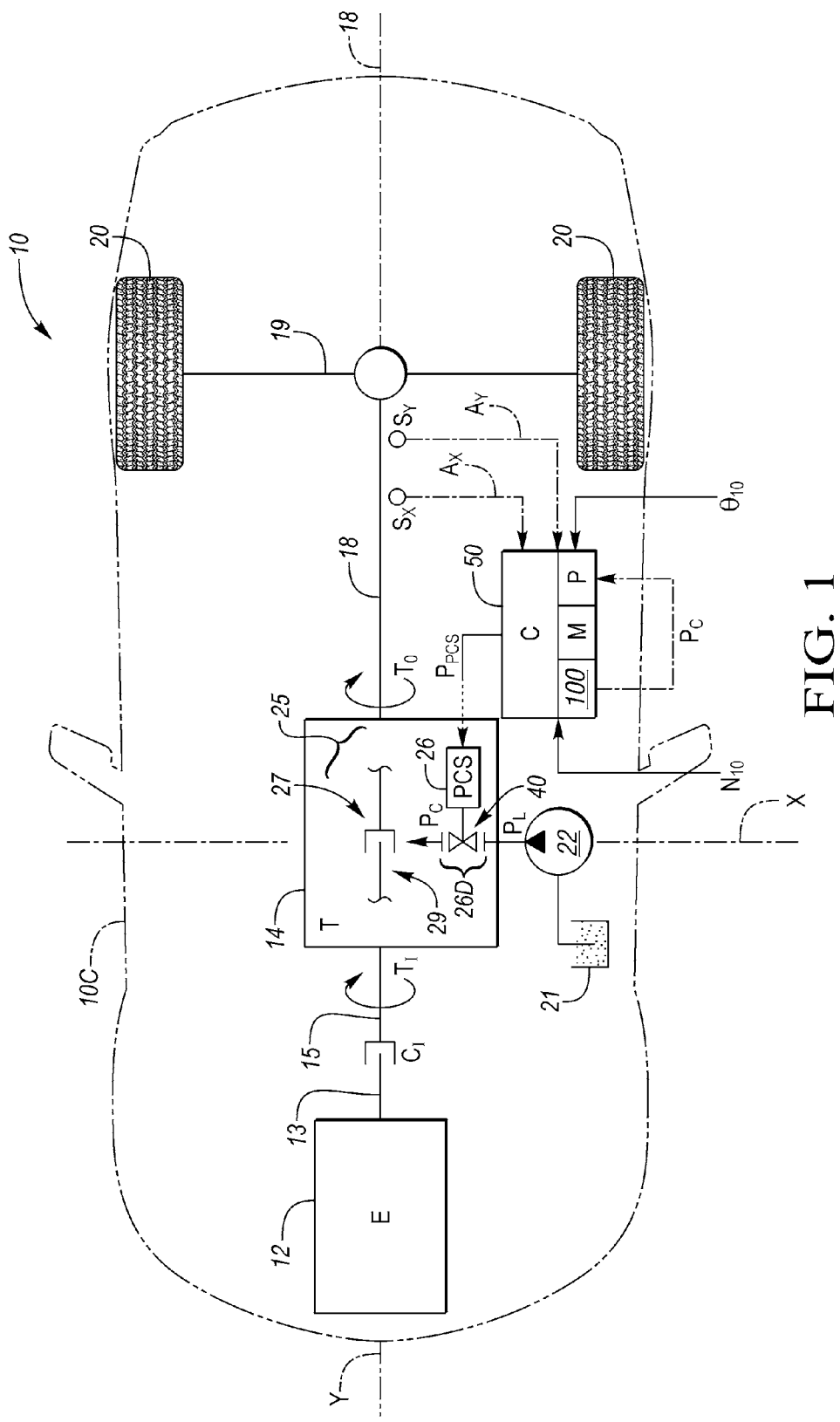
FIG. 1 is a schematic illustration of a vehicle having a transmission with a clutch, a pressure control solenoid (PCS) valve device having a PCS and a regulating valve, and a controller programmed to control the PCS in an acceleration-compensated manner via a method as set forth herein.

Referring to the drawings, wherein like reference numbers refer to like components throughout the several Figures, an example vehicle 10 is shown schematically in FIG. 1 having a chassis 10C. The vehicle 10 includes an internal combustion engine (E) 12, a transmission (T) 14 connected to the engine 12, and a controller (C) 50. The transmission 14 includes a clutch circuit 25 in fluid communication with a pump 22, which draws fluid from a sump 21. Additional structure of the transmission 14, omitted for illustrative simplicity, may include one or more gear sets having gear elements such as a ring gear, sun gear, and carrier member. The clutch circuit 25, which is likewise shown schematically for illustrative simplicity, includes a pressure control solenoid (PCS) valve device 26D, i.e., a duty cycle-controlled device that manages pressure in the transmission 14 as is well known in the art. As used herein, the term "PCS valve device" may include a PCS 26 and a separate regulating valve 40, or it may include a direct acting PCS 26 with an integral regulating valve 40, i.e., the PCS 26 and the regulating valve 40 may be integrated into one device. The clutch circuit 25 further includes a regulating valve 40 controlled via the PCS 26, a friction clutch 27, and a clutch piston 29 in fluid communication with the regulating valve 40. The clutch piston 29 applies a clutch pressure (arrow $P_C$) to the friction clutch 27 during a shift of the transmission 14 in response to pressure commands (arrow $P_{PCS}$) to the PCS 26 from the controller 50.

The controller 50, which is in communication with the PCS 26 and operable for changing an electrical current to coils or windings of the PCS 26 to thereby change a PCS pressure (arrow $P_{PCS}$), and thereby change a position of the regulating valve 40 as is known in the art, is specially programmed to compensate for inertial effects acting on the known mass of the regulating valve 40 in the overall control of a shift of the transmission 14, particularly during aggressive acceleration maneuvers. To achieve the desired ends, the controller 50 is programmed to determine, i.e., receive or calculate, one or more acceleration values (arrows $A_X$, $A_Y$) describing a lateral and/or a longitudinal acceleration value with respect to corresponding lateral and longitudinal axes X, Y of the vehicle 10.

Additionally, programming of the controller 50 allows the controller 50 to calculate the clutch pressure (arrow $P_C$) in a selective manner using the determined acceleration value(s) $A_X$ and/or $A_Y$, and to control an operation of the regulating valve 40 during the shift of the transmission 14 using the calculated clutch pressure (arrow $P_C$) according to the method 100. A simplified example regulating valve 40 is described below with reference to FIG. 2, with an example of the method 100 described in further detail with reference to FIG. 3.

With respect to the example vehicle 10 of FIG. 1, the engine 12 delivers input torque (arrow $T_I$) to an input member 15 of the transmission 14 via a crankshaft 13, e.g., across an input clutch CI or hydrodynamic torque converter assembly, in response to receipt of throttle request, e.g., from an accelerator pedal (not shown). The transmission 14 transfers the input torque (arrow $T_I$) through various gear sets (not shown) of the transmission 14 such that an output torque (arrow $T_O$) is ultimately transferred to an output member 18, and from the output member 18 to one or more drive axles 19 and drive wheels 20, via operation of a plurality of friction clutches, only one of which, i.e., friction clutch 27, is depicted in FIG. 1 for illustrative simplicity. The drive wheels 20 may be front and/or rear wheels 20 in different embodiments, and therefore the rear wheel configuration of FIG. 1 is illustrative and non-limiting. A typical multi-speed embodiment of the transmission 14 would include multiple planetary gear sets interconnected via various rotating or braking friction clutches, with each friction clutch controlled via a corresponding regulating valve 40. Control of such clutches by the controller 50 ultimately transfers the input torque (arrow $T_I$) through the transmission 14 at a particular speed ratio to produce the output torque (arrow $T_O$).

The controller is programmed and constructed to execute computer code embodying steps of a method 100. The controller 50 may be embodied as a digital computer having a processor (P) and memory (M). The memory (M) includes sufficient amounts of tangible, non-transitory memory, e.g., read only memory, flash memory, optical and/or magnetic memory, electrically-programmable read only memory, and the like. Memory (M) also includes sufficient transient memory such as random access memory, electronic buffers. Hardware of the controller 50 includes a high-speed clock, analog-to-digital and digital-to-analog circuitry, and input/output circuitry and devices, as well as appropriate signal conditioning and buffer circuitry.

In a possible embodiment, the vehicle 10 of FIG. 1 may include one or more accelerometers, e.g., first and second accelerometers $S_X$ and $S_Y$ in communication with the controller 50. Each accelerometer $S_X$, $S_Y$ is operable for measuring a corresponding acceleration value for a given axis X or Y. For instance, the first and second accelerometers may be positioned with respect to the vehicle 10, e.g., on the chassis 10C or within the transmission 14. The first and second accelerometers $S_X$ and $S_Y$ are operable for measuring lateral and longitudinal acceleration of the vehicle 10, with the terms "lateral" and "longitudinal" indicating the axial direction of measurement with respect to the lateral and longitudinal axes X and Y of the vehicle 10, or of the transmission 14. Thus, the controller 50, as part of the method 100, may receive one or more measured acceleration values (arrows $A_X$, $A_Y$). Alternatively, the controller 50 may calculate the acceleration value(s) (arrows $A_X$, $A_Y$) using velocity (arrow $N_{10}$) and steering angle ($\theta_{10}$) of the vehicle 10, e.g., as measured via a respective velocity sensor and steering angle sensor (not shown).

Figure 2:
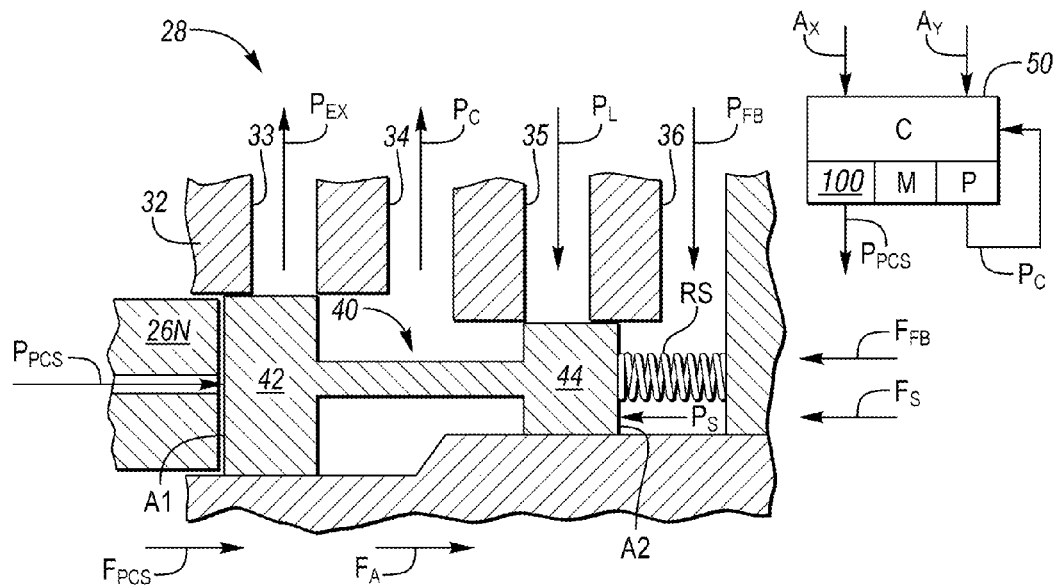
FIG. 2 is a schematic illustration of a portion of a regulating valve and controller usable as part of the transmission of FIG. 1.

Referring briefly to FIG. 2, the controller 50 is depicted along with the regulating valve 40 and a nozzle portion 26N of the PCS 26 of FIG. 1. The regulating valve 40 has respective disc-shaped first and second spool ends 42 and 44 of respective major and minor surface areas A1 and A2. A solenoid control current from the controller 50 to the coils of the PCS 26 of FIG. 1 ultimately causes the PCS pressure (arrow $P_{PCS}$) to be delivered through the nozzle portion 26N to the first end 42 of the regulating valve 40, thus moving the regulating valve 40 to compress a pre-loaded return spring (RS). The nozzle portion 26N also acts as a mechanical stop for the regulating valve 40 which prevents over-travel of the regulating valve 40.

A valve body 32 surrounding the regulating valve 40 defines a plurality of fluid channels, with the identity of the fluid channels depending on the design of the regulating valve 40. In the simplified example of FIG. 2, the valve body 32 may define an exhaust channel 33 receiving exhaust pressure (arrow $P_{EX}$), a clutch feed channel 34 delivering clutch pressure (arrow $P_C$) to the clutch 27, a line pressure channel 35 receiving line pressure (arrow $P_L$) from the pump 22, and a pressure feedback channel 36 receiving feedback pressure (arrow $P_{FB}$) from elsewhere in the clutch circuit 25 to allow the regulating valve 40 to perform its pressure regulation function, as is known in the art. Line pressure (arrow $P_L$) from the pump 22 is fed into the regulating valve 40 via the line pressure channel 35 and, depending on the commanded PCS pressure (arrow $P_{PCS}$), can be delivered to the clutch as part of the clutch pressure (arrow $P_C$).

The controller 50 of FIGS. 1 and 2, as noted above, is specially programmed to calculate the clutch pressure (arrow $P_C$) during operation of the vehicle 10 as a function of the acceleration of the vehicle 10. Thus, the controller 50 determines the acceleration value(s) (arrow $A_X$, $A_Y$) and automatically compensates for the effects of acceleration on the shift performance of the regulating valve 40, as controlled by the PCS 26. In general terms, the controller 50 calculates clutch force ($F_C$) using the following force-balance equation:

$$F_C = (F_{PCS} - F_S - F_{FB} + F_A)G$$

where G is the gain, i.e., the ratio A1/A2, $F_{PCS}$ is the force applied by the PCS 26, $F_S$ is the force of the return spring (RS), $F_{FB}$ is the feedback force through fluid channel 36, and $F_A$ is the force acting on the regulating valve 40 due to acceleration. As is known in the art, F=ma, and the mass (m) of the regulating valve 40 is a known quantity, such that acceleration forces ($\ddot{x}$) on the regulating valve 40 are readily calculated.

More specifically, the controller 50 may calculate the clutch force as follows:

$$F_C = \frac{(A1)(P_{PCS}) - (Kx + F_{PL}) - m\ddot{x}}{A2}$$

where K is the spring constant of the return spring (RS), x is the linear displacement of the regulating valve 40, $F_{PL}$ is the preload force on the return spring (RS), m is the mass of the regulating valve 40, and $\ddot{x}$ is the acceleration value as noted above. In this equation, the offset pressure of the regulating valve 40 may be defined as:

$$\frac{Kx + F_{PL}}{A2}$$

which could be programmed into a lookup table for a corresponding acceleration value, such that the controller 50, for any given acceleration, could selectively extract an offset pressure value and apply it in calculating clutch pressure (arrow $P_C$) to control a position or other operation of the regulating valve 40 in a manner that compensate for effects of acceleration acting on the regulating valve 40.

The regulating valve 40, when installed in the transmission 14, has a predetermined axial orientation with respect to a lateral or longitudinal axis X and Y of the vehicle 10. Therefore, the controller 50 may be programmed to use the lateral or longitudinal acceleration values (arrows $A_X$, $A_Y$) based on the predetermined orientation of the regulating valve 40. For instance, if the regulating valve 40 shown in FIG. 2 is arranged along or parallel to the longitudinal axis Y of the vehicle 10, the longitudinal acceleration value (arrow $A_Y$) may be used in the above formulas. Likewise, if the regulating valve 40 is arranged along or parallel to the lateral axis X of the vehicle 10, the lateral acceleration value (arrow $A_X$) may be used in the above formulas. In other embodiments in which the regulating valve 40 is arranged along any other axis, a vector could be calculated as a function of the lateral and longitudinal acceleration values (arrows $A_X$, $A_Y$), and used in the above equations, without departing from the intended inventive scope.

Figure 3:
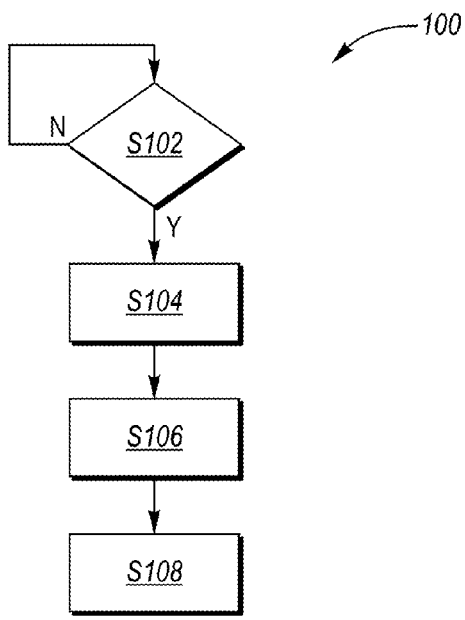
FIG. 3 is a flow chart describing a method of controlling a PCS in a PCS valve device of FIGS. 1 and 2 in an acceleration-compensated manner.

Referring to FIG. 3, an example embodiment of the method 100 begins with step S102, wherein the controller determines whether a shift of the transmission 14 is requested in logic of the controller 50. That is, the controller 50 evaluates typical shift control parameters such as speed of the engine 12, input member 15, and/or output member 18, throttle request, braking levels, current gear ratio, etc., and determines if a shift to another gear state is required. The method proceeds to step S104 when the shift is requested.

At step S104, the controller 50 determines the acceleration value(s) (arrows $A_X$, $A_Y$) of the vehicle 10. In determining the acceleration value(s) (arrows $A_X$, $A_Y$), the controller 50 may receive the measured accelerations from the accelerometers $S_X$, $S_Y$ of FIG. 1, and/or the controller 50 may calculate the acceleration values (arrows $A_X$, $A_Y$). The method 100 proceeds to step S106 when the acceleration value(s) (arrows $A_X$, $A_Y$) are received or otherwise known.

Step S106 may include accessing a lookup table indexed by acceleration forces and the offset pressure disclosed above. As an illustrative embodiment, the lookup table may add an offset pressure to the PCS pressure (arrow $P_{PCS}$) to ultimately affect the clutch pressure (arrow $P_C$) when acceleration forces exceed ±0.2 G or some other relatively low threshold value. Above this threshold level, the controller 50 may apply an offset pressure in a linear manner, e.g., rising linearly in one or more stages or with one or more rates of increase from 0 at +0.1 G to a calibrated maximum offset pressure at a calibrated maximum acceleration force, e.g., ±1.5 G, thereafter leveling off such that any acceleration forces exceeding the calibrated maximum acceleration force will receive the calibrated maximum offset pressure. As acceleration forces may affect performance in different ways depending on magnitude, more aggressive offsets may be used for higher acceleration relative to low acceleration in some embodiments, effectively tuning offset performance to the severity of the acceleration event. The method 100 then proceeds to step S108.

At step S108, the controller 50 controls the shift of the transmission 14 using the calculated PCS pressure ($P_{PCS}$) from step S106. That is, the adjusted PCS pressure ($P_{PCS}$) enables the new clutch pressure (arrow $P_C$) to be determined, such that the controller 50 can control a required position of the regulating valve 40, i.e., the linear displacement of the regulating valve 40, by changing the PCS pressure command (arrow $P_{PCS}$). This results in changing of an electrical current command to the PCS 26, thus controlling the pressure to the regulating valve 40 and, ultimately, modifying or maintaining the required clutch pressure (arrow $P_C$).

As possible acceleration-induced transient conditions such as turbine flare or tie-up can be observed in the presence of specific acceleration forces for a given vehicle, those of ordinary skill in the art will appreciate, in view of this disclosure, that the offset pressures can be calibrated for each regulating valve 40 in a given vehicle 10 to reduce or eliminate instances of turbine flare or tie-up. That is, the values used to offset the forces of acceleration can be determined for a given vehicle 10, stored in memory (M) of the controller 50, and subsequently used to control operation of each regulating valve 40 used to control a given shift of the transmission 14. As such, the use of acceleration data may be selectively applied to a given regulating valve 40 in a manner that is tailored to the orientation of the regulating valve 40 within the vehicle, and based on the effects of acceleration on the performance of a particular regulating valve 40 for the given shift and improving overall shift quality.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:
1. A vehicle comprising:
   an engine;
   a transmission connected to the engine, including:
      a pressure control solenoid (PCS) valve device having
         a PCS and a regulating valve controlled via the PCS;

a friction clutch; and a clutch piston in fluid communication with the regulating valve, wherein the clutch piston is operable to apply a clutch pressure to the friction clutch; and a controller in communication with the PCS that is programmed to:

determine an acceleration value describing at least one of a lateral and longitudinal acceleration force of the vehicle;

calculate the clutch pressure using the determined acceleration value; and control an operation of the regulating valve via the PCS using the calculated clutch pressure to thereby control a shift of the transmission in an acceleration-compensated manner.

2. The vehicle of claim 1, further comprising an accelerometer in communication with the controller and operable for measuring the acceleration value, wherein the controller is programmed to determine the acceleration value by receiving the measured acceleration value from the accelerometer.

3. The vehicle of claim 2, wherein the accelerometer includes a first accelerometer operable for measuring the lateral acceleration force and a second accelerometer operable for measuring the longitudinal acceleration force.

4. The vehicle of claim 3, wherein the regulating valve has a predetermined axial orientation with respect to a lateral or longitudinal axis of the vehicle, and wherein the controller is programmed to use the lateral or longitudinal acceleration force based on the predetermined axial orientation of the regulating valve.

5. The vehicle of claim 1, wherein the operation of the regulating valve is a position of the regulating valve.

6. The vehicle of claim 1, wherein the controller is programmed with a lookup table containing a calibrated offset pressure of the PCS corresponding to the acceleration value.

7. The vehicle of claim 1, wherein the regulating valve has a linear displacement and includes a return spring, and wherein the controller is programmed to calculate the clutch pressure using surface areas of the regulating valve, a pressure command to the PCS, a return spring pressure of the return spring, and the acceleration value.

8. A transmission system comprising:

a pressure control solenoid (PCS) valve device having a PCS and a regulating valve controlled via the PCS;

a transmission having a friction clutch; and a clutch piston in fluid communication with the regulating valve, wherein the clutch piston is operable to apply a clutch pressure to the friction clutch during a shift of the transmission; and a controller in communication with the regulating valve that is programmed to:

determine an acceleration value describing at least one of a lateral and longitudinal acceleration force of the vehicle;

calculate the clutch pressure using the received acceleration value; and control an operation of the regulating valve via the PCS using the calculated clutch pressure to thereby control a shift of the transmission in an acceleration-compensated manner.

9. The transmission system of claim 8, further comprising an accelerometer in communication with the controller, wherein the controller is programmed to determine the acceleration value by receiving the measured acceleration value from the accelerometer.

10. The transmission system of claim 9, wherein the accelerometer includes a first accelerometer operable for measuring the lateral acceleration force and a second accelerometer operable for measuring the longitudinal acceleration force.

11. The transmission system of claim 10, wherein the regulating valve has a predetermined orientation with respect to a lateral or longitudinal axis of the transmission, and wherein the controller is programmed to use the lateral or longitudinal acceleration force based on the predetermined orientation of the regulating valve.

12. The transmission system of claim 8, wherein the operation of the regulating valve is a position of the regulating valve.

13. The transmission system of claim 8, wherein the controller is programmed with a lookup table containing a calibrated offset pressure of the PCS corresponding to the acceleration value.

14. The transmission system of claim 8, wherein the regulating valve has a linear displacement and includes a return spring, and wherein the controller is programmed to calculate the clutch pressure using surface areas of the regulating valve, a pressure command to the PCS, a return spring pressure of the return spring, and the acceleration value.

15. A method for compensating for acceleration in control of a regulating valve of a pressure control solenoid (PCS) valve device in a vehicle having a transmission, wherein the regulating valve is controlled via a PCS of the PCS valve device, the method comprising:

determining, via a controller, an acceleration value describing at least one of a lateral and longitudinal acceleration force of the vehicle;

calculating a clutch pressure for a friction clutch of the transmission via the controller using the determined acceleration value; and controlling an operation of the regulating valve via the PCS using the calculated clutch pressure to thereby control a shift of the transmission in an acceleration-compensated manner.

16. The method of claim 15, wherein determining the acceleration value includes measuring the acceleration value using an accelerometer.

17. The method of claim 16, wherein measuring the acceleration value using an accelerometer includes measuring a lateral acceleration force and a longitudinal acceleration force of the vehicle using first and second accelerometers, respectively.

18. The method of claim 15, wherein controlling an operation of the regulating valve includes controlling a position of the regulating valve.

19. The method of claim 15, wherein calculating the clutch pressure includes applying a calibrated offset pressure corresponding to the acceleration value.

20. The method of claim 15, wherein calculating the clutch pressure includes using surface areas of the regulating valve, a pressure command to the PCS, a return spring pressure of a return spring of the clutch, and the acceleration value.

* * * * *